United States Patent [19]
Jureit

[11] 3,731,583
[45] May 8, 1973

[54] CONNECTOR PLATE

[75] Inventor: John Calvin Jureit, Coral Gables, Fla.

[73] Assignee: Automated Building Components, Inc., Miami, Fla.

[22] Filed: July 30, 1971

[21] Appl. No.: 167,374

[52] U.S. Cl. .................. 85/13, 287/20.92 L, 52/712
[51] Int. Cl. ............................................. F16b 15/00
[58] Field of Search .................. 287/20.92 L; 85/11, 85/13; 52/715, 712

[56] References Cited

UNITED STATES PATENTS

| | | | |
|---|---|---|---|
| 3,016,586 | 1/1962 | Atkins | 85/13 X |
| 3,011,226 | 12/1961 | Menge | 287/20.92 L |
| 3,241,424 | 3/1966 | Moelenpah et al. | 85/13 |
| 3,266,362 | 8/1966 | Carr | 85/13 |
| 3,390,902 | 7/1968 | Jureit | 287/20.92 L |
| 3,479,783 | 11/1969 | Jureit | 287/20.92 L |
| 3,494,645 | 2/1970 | Jureit | 287/20.92 L |

*Primary Examiner*—Reinaldo P. Machado
*Assistant Examiner*—Wayne L. Shedd
*Attorney*—Le Blanc & Shur

[57] ABSTRACT

The connector plate has a plurality of nail-like teeth struck to project at right angles to the plate for embedment into adjoining wooden members of the hard wood variety. The teeth are struck in longitudinal rows, the teeth in each row being staggered relative to the teeth of next adjacent rows. The slots in next adjacent rows of teeth extend from the associated teeth in opposite directions. Each tooth has lateral shoulders projecting from the opposite edges of the tooth adjacent its base portion. The slot portions left in the plate by the shoulder portions lie opposite the metal portion of the plate between adjacent slots in next adjacent longitudinal rows thereby preserving net section. Increased back-to-back spacing of the teeth in next adjacent rows is provided to preclude cutting and slicing the wood upon insertion of the teeth into the wooden members of the joint. Also, the tips of the teeth are substantially blunt with the lateral edges defining each tooth tip forming an included angle of about 100 degrees whereby the tendency of the wood to split in particularly hard woods is substantially reduced.

8 Claims, 5 Drawing Figures

PATENTED MAY 8 1973

INVENTOR
JOHN CALVIN JUREIT

BY Le Blanc & Shur

ATTORNEYS

INVENTOR
JOHN CALVIN JUREIT

BY  Le Blanc & Shur

ATTORNEYS

CONNECTOR PLATE

This invention relates to metal connectors and structural wood joints and particularly to connectors and joints of the butt type used in prefabricated wooden structures such as roof trusses. More particularly, the present invention relates to connectors for use with particularly hard woods of the type found and used widely in Australia and Southeast Asia, such as Eucalyptus Gum, Rimu Radiata Pine, etc.

The joinder of structural load bearing wooden members has recently been advanced to a significant extent with the advent of structural wooden joints which are connected solely by means of metal plates having slender, elongated, nail-like teeth struck therefrom and embedded in the wooden members, such as illustrated in U.S. Pat. No. 2,877,520. Plates of this type, wherein the teeth thereof serve as the only means holding the plates onto the wooden members and the wooden members in adjoining relation, are conventionally formed of sheet metal of a thickness of at least 14 U.S. standard gauge due to the heavy loads borne by the plates when the same are used, for example, in prefabricated roof and floor truss assemblies. There has evolved a recent tendency to utilize thinner gauge metal, such as for example, 18 and 20 U.S. standard gauge, in the formation of connector plates of this type for use in joints having similar loadings as the joints joined by 14 gauge metal plates. For example, U.S. Pat. No. 3,390,902 of common assignee herewith discloses a plate of this type wherein a unique nail arrangement is provided such that the thinner gauge metal can be utilized. There are, however, particularly hard woods, for example, Eucalyptus Gum and Rimu Radiata Pine, as are commonly found and utilized in Australia and Southeast Asia, where such plates and even the heavier 14 gauge plates cannot be used effectively. The teeth of these standard plates have a tendency to bend or buckle upon attempted penetration into such particularly hard woods whereby the number of teeth effective per unit area is substantially reduced. This, in turn, reduces the overall resistance of the joint in shear and permits the fully inserted nails to withdraw at reduced loadings on the joint members. In the particular harder woods, problems are encountered which do not normally exist in utilizing standard connector plates in the generally softer woods. For example, the sharp pointed teeth generally provided connector plates have a tendency when applied to hard woods to split the wood rather than shear the wood. Also, the column strength of the teeth provided on conventional connector plates is often insufficient to resist buckling and bending of the tooth upon insertion into these hard woods. Furthermore, these hard woods have a tendency to cut more readily in comparison with the softer woods. When utilizing conventional plates with the teeth in closely spaced transversely extending rows, there is a tendency for the member to be cut or severed to a limited depth transversely of the member upon insertion or attempted insertion of the teeth into the wood. This, of course, weakens the joint. Consequently, there are problems in providing connector plates effective in the harder woods and which problems do not generally arise in providing connector plates for use in softer woods of the type more conventionally utilized in the United States.

Another problem and limiting factor in the employment of connector plates of this type resides in the ability of the metal to withstand shear and bending stresses. For the heavier woods, it is desirable to provide a tooth of substantial cross section to avoid problems associated with tooth failure due to buckling or high compressive loadings upon insertion. However, for a given metal thickness, the tooth can only be increased in width to provide additional metal in the cross section of the tooth. Should this be done, a reduction in the net section across the plate occurs (depending on the relative location of the teeth and slots in the plate) resulting in a decrease of net section across the plate and possible failure in tension. Also, the plate, upon reduction of its net section, is more susceptive to tears or fractures across the plate, particularly in the areas of the plate defining sharp corners of the slots. For example, tears are often set up at the juncture of the base of the teeth along its sides due to the punch.

According to the present invention, it has been found that, by utilizing 14 U.S. standard gauge sheet metal in conjunction with a unique and distinct combination of tooth shapes and disposition of teeth and associated slots throughout the plate, a connector plate particularly effective for use with very hard woods is provided. To accomplish this while concurrently not substantially reducing the capability of the plate to carry shear and bending loadings, the present invention provides a sheet metal plate formed of 14 U.S. standard gauge having a plurality of nail-like teeth struck therefrom and projecting generally normally thereto. The teeth are arranged in longitudinally extending rows with the teeth in next adjacent rows being staggered in a longitudinal direction. The teeth are struck such that the slots in each longitudinal row of teeth extend from the teeth in like directions while the slots of next adjacent longitudinal rows of teeth extend from the teeth in opposite directions. Each tooth is provided with a shoulder along opposite edges of the tooth and adjacent the base portion thereof to provide increased resistance to bending upon insertion and in shear when finally inserted. The slots left by the enlarged base portions of the teeth lie adjacent the metal plate portions between longitudinally adjacent slots in next laterally adjacent rows of slots and the reduced slot portions left by the tooth tips of the next laterally adjacent rows of teeth. This arrangement preserves the net section throughout the plate thereby providing increased capability for carrying tensile loadings.

It is significant that the plate of the present invention provides increased back-to-back spacing of the closest teeth in next adjacent rows of teeth in comparison with the back-to-back spacing provided in standard plates whereby the tendency of the teeth to cut or sever the wood transversely of the wooden member upon insertion of the teeth into the wood is substantially minimized and/or eliminated. Furthermore, the teeth hereof are provided with tips having substantially shallow pointed or partially blunt ends. Particularly, the edges defining the tips of the teeth form an included angle of about 100°. This is particularly required in hard woods as previously noted whereby a shearing action rather than a splitting action is provided upon insertion of the teeth.

Accordingly, it is a primary object of the present invention to provide a novel and improved connector plate for joining wooden members and which plate is particularly useful for joining members comprised of especially hard woods such as Eucalyptus Gum, Rimu Radiata Pine, etc.

It is another object of the present invention to provide a novel and improved connector plate having a unique configuration of teeth and disposition thereof in the plate whereby improved load carrying capability of the plate is obtained.

It is still another object of the present invention to provide an improved connector plate for joining wooden members one to the other wherein the connectors are of the type having a plurality of nail-like teeth struck therefrom with enlarged base portions comprising shoulders on opposite edges of the teeth to provide improved shear load carrying capability.

It is a further object of the present invention to provide an improved connector plate having a plurality of nail-like teeth struck therefrom which terminate in shallow pointed or partially blunt tips to avoid splitting particularly hard woods, upon insertion.

It is a still further object of the present invention to provide a novel and improved connector plate having a plurality of nail-like teeth struck therefrom in longitudinally extending and longitudinally staggered rows wherein increased back-to-back spacing is provided to avoid cutting or severing the wood in a transverse direction upon insertion of the teeth into the wood.

It is a related object of the present invention to provide a novel and improved connector plate for joining the wooden members of a joint in a truss and the like having teeth with improved compressive load bearing characteristics.

These and further objects and advantages of the present invention will become more apparent upon reference to the following specification, appended claims and drawings, wherein:

Figure 1:
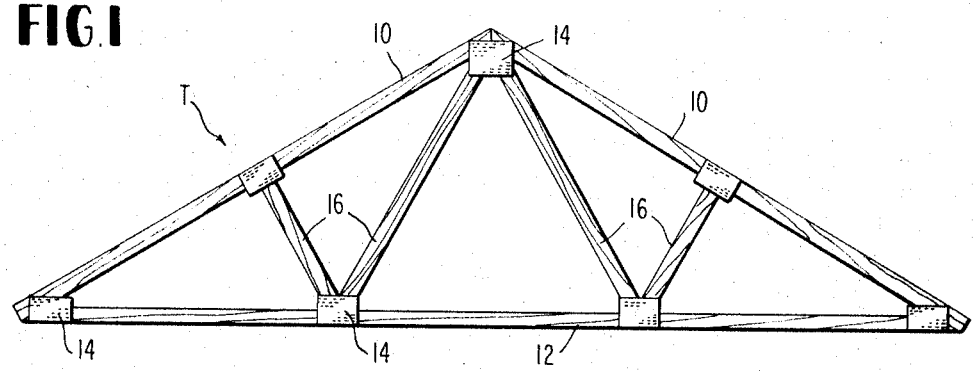
FIG. 1 is a side elevational view of a truss wherein the members of the truss are joined one to the other by connector plates constructed in accordance with the present invention.

Referring now to the drawings, particularly to FIG. 1, there is shown a truss T, for example, a roof truss, having upper and lower chords 10 and 12 respectively, joined one to the other by connector plates, generally indicated 14, and constructed in accordance with the present invention. The intermediate chord members 16 are also joined to the upper and lower chord members 10 and 12, respectively, of truss T by plates 14 of the type herein disclosed.

Figure 2:
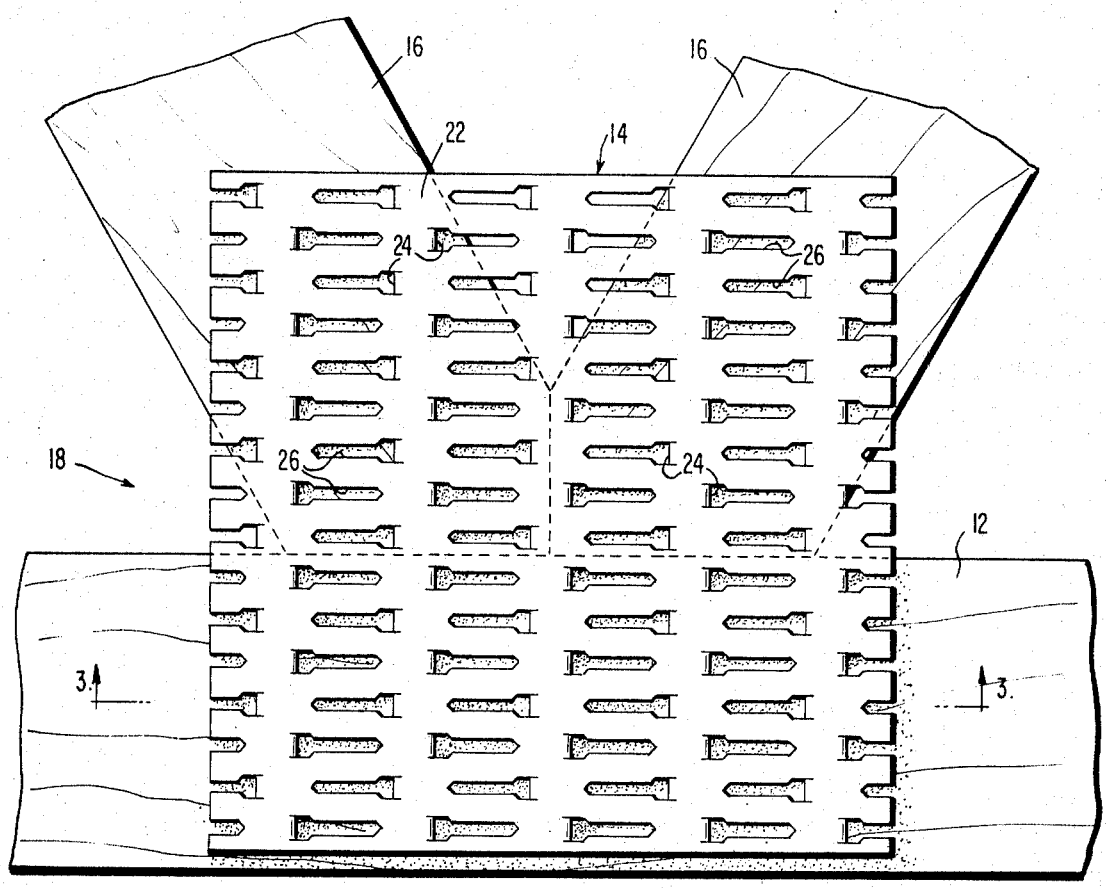
FIG. 2 is an enlarged fragmentary plan view of the plate hereof as embedded into the members forming a joint in the truss illustrated in FIG. 1.
Figure 3:
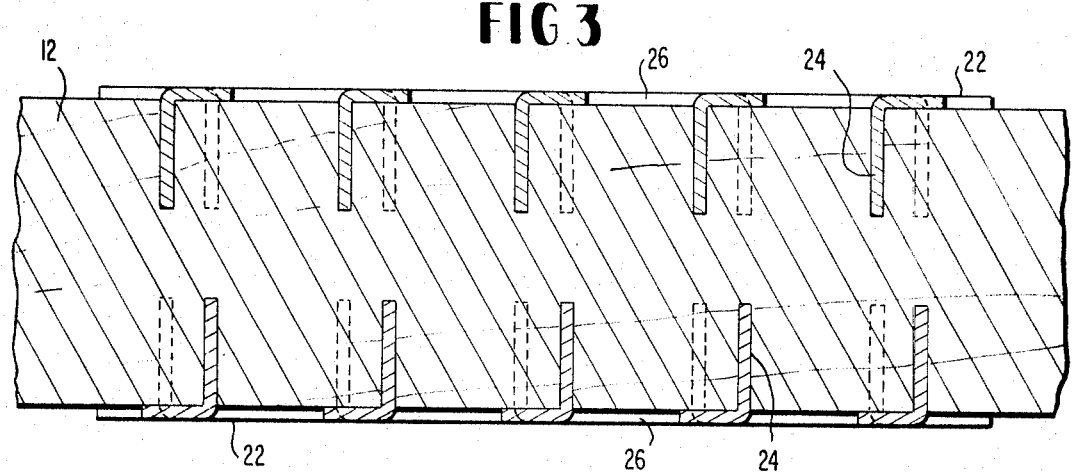
FIG. 3 is a cross sectional view thereof taken generally about on line 3–3 in FIG. 2.

Referring now particularly to FIG. 2, there is shown a structural joint, generally indicated 18, joined together by a pair of connector plates 14 disposed on opposite sides of the joint. The particular joint illustrated joins the lower ends of a pair of intermediate chord members 16 with the lower chord member 12 of the truss illustrated in FIG. 1. In accordance with the present invention, connector plate 14 comprises a sheet metal plate 22 having struck therefrom a plurality of longitudinally extending laterally spaced rows of nail-like teeth 24 and which teeth 24 leave longitudinally extending laterally spaced rows of elongated slots 26 in plate 22. Teeth 24 are embedded into the opposite sides of the members of the joint in any suitable manner, preferably by the application of pressure to plate 22 by a suitable press which may either have a reciprocating platen or comprise a roller type press. While only a single plate is illustrated in FIG. 2, it will be understood that two plates are normally employed with each joint, with one plate on each side of the wooden members with the teeth in the opposed plates extending towards one another within the wooden members.

Figure 5:
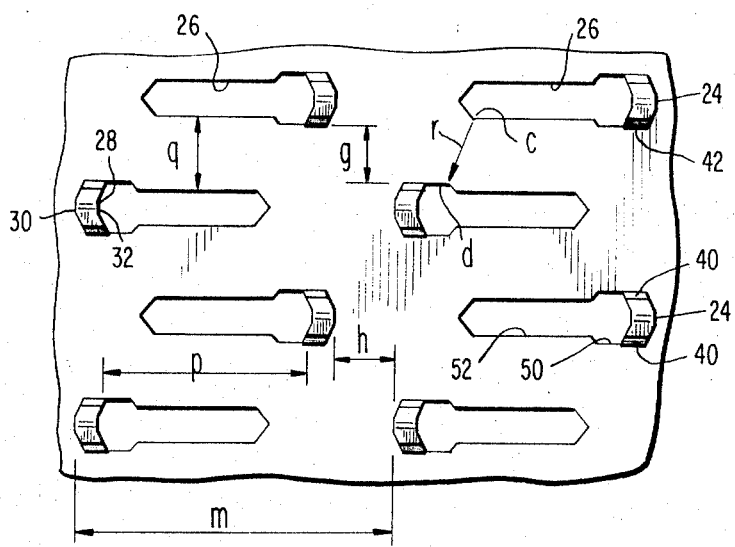
FIG. 5 is an enlarged fragmentary plan view of a slot in the plate from which a tooth is struck.

Teeth 24 in each longitudinal row thereof are struck in the same direction so that the slots 26 left thereby extend from the teeth in the same direction while the teeth 24 in next adjacent rows are struck in opposite directions such that the slots in adjacent longitudinal rows extend from the associated teeth in opposite directions. As best illustrated in FIG. 5, each tooth 24 has a generally concave cross section with the struck face 28 being generally concave and the opposite face being generally convex. The teeth are struck to form a central track 32 in the concave face with a like but oppositely configured back face 30. This particular cross section provides substantial tooth reinforcement along the length of the teeth and provides improved resistance to buckling and compressive forces upon insertion into the wooden members. This is particularly important when the teeth are driven into hard woods and prevents a reduction in the number of load bearing teeth effective in the wood. The teeth 24 in plate 22 are arranged in repeating patterns of two rows of teeth and slots transversely across the plate.

To facilitate penetration of the teeth, particularly hard woods and in a manner to substantially eliminate splitting the wood, each tooth is provided with a pointed end 34, the side edges of which form an included angle $e$ preferably about 100°. The tips of the teeth are thus shallow pointed or partially blunted. In particularly hard woods of the type previously noted, this partially blunted tooth tip reduces or eliminates the tendency of the hard wood to split upon insertion and a wood shearing, rather than splitting, action is provided. Sharper included angles, for example, included angles on the order of about 60° which are provided in conventional connector plates for edges defining the tips of teeth, would tend to split the hard wood and hence reduce its load bearing capability in the joint. The shallow pointed or partially blunt tooth tips thus significantly enhance the load bearing capacity of the joint.

It will be noted from FIG. 2 that the arrangement of the teeth in the plate is such that transverse rows of teeth are also provided. It will also be noted that adjacent pairs of these transverse rows of teeth are closer together than other adjacent pairs of teeth. That is, the teeth in longitudinally adjacent rows which lie in close back-to-back relation one to the other form closely spaced transversely extending rows of teeth. It has been found that close longitudinal spacing of these rows of teeth have a tendency to cut or sever the wood in a transverse direction upon insertion of the teeth into the wood. This is particularly critical in hard woods as transverse cuts through the full lateral extent of the wood substantially reduce the load bearing capability of the joint. To preclude these transverse cuts, the back-to-back spacing of the closest teeth in next adjacent longitudinal rows is substantially increased in comparison with the corresponding back-to-back spacing in conventional plates. This increased back-to-back spacing, as particularly noted hereinafter with reference to the preferred embodiment hereof, substantially eliminates and precludes the tendency of the teeth to form a transversely extending cut or notch in the hard wood. A more effective joint is thus formed.

Furthermore, the teeth hereof are shortened in length in comparison with the teeth utilized in conventional plates. The slenderness ratio is significantly reduced whereby each tooth, when it undergoes column loading upon insertion into the wood, has improved resistance to buckling and compressive forces. Thus, when utilizing the present plate in particularly hard woods substantially all of the teeth are fully embedded into the wood and hence are fully effective to carry the joint loading. Otherwise, the teeth might tend to buckle, thus reducing the number of effective teeth per unit area which, in turn, would result in decreased load bearing capability of the joint.

Figure 4:
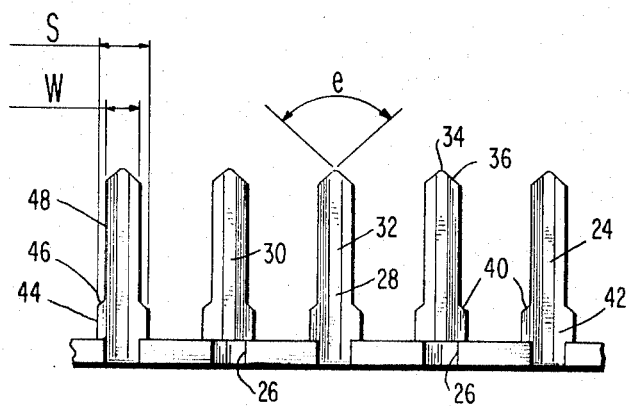
FIG. 4 is an enlarged fragmentary elevational view of the teeth of the plate illustrated in FIG. 2.

According to the present invention, the foregoing described teeth characteristics and relative disposition of the teeth are provided without substantial reduction in the capability of the plate to withstand shear and bending loadings and, in fact, the load carrying capability of the plate is considerably enhanced by the novel and unique configuration of the teeth and their disposition in the plate as will now be described. The plate of the present invention provides, as best illustrated in FIG. 4, a pair of lateral shoulder formations 40 on the opposite sides of the tooth adjacent the base portion thereof. The high resistance to bending and compressive forces upon insertion of the teeth into the members of the joint and the unexpected high shear strength of the teeth result in part from the provision of such shoulders and the location of the slot formations left thereby relative to adjacent slot formations as hereinafter described. The provision of the shoulders adjacent the base of the teeth provides an increase in the quantity of metal at base portion 42 in comparison with the quantity of metal which would have been bent if the teeth were struck with a constant width from base to tip. By providing teeth shouldered at their bases, and on opposite sides thereof, the base portions of the teeth provide additional shear and bending strength at the points along the teeth which obtain maximum shear and bending loadings, respectively. For reasons hereinafter described, each of the shoulders comprises an edge 44 extending linearly from the plate 22 substantially parallel to the centerline of the tooth for a predetermined distance. Edge 44 terminates in an edge 46 which angles inwardly toward the shank portion 48 of tooth 24. More particularly, edge 46 extends from edge 44 to the lateral edge of the shank portion of the tooth and forms an angle corresponding to the angle of the tip edge on the same side of the tooth. As noted hereinafter more particularly, the base portion extends from the plate for a distance approximately 20 percent of the length of the tooth. By providing an increased width at the base of the tooth, the resistance to shear loading and bending upon insertion of the tooth into the wooden members is greatly increased. However, it will be appreciated that while such increase in shear and bending load carrying capability is desirable, the metal forming the shoulder portion is removed from the plate, hence reducing the quantity of metal across the plate to withstand joint loadings. Thus, the disposition of each tooth, particularly the shoulders 40 thereof, relative to the disposition of the slots of the adjacent teeth is particularly significant as it is an important factor in maximizing and preserving the effective overall net section. To preserve such net section, the teeth 24 in each row are longitudinally displaced from the corresponding teeth in the next adjacent rows thus arranging the teeth in each row in longitudinally staggered relation with respect to the corresponding teeth in next adjacent rows. Furthermore, the rows of teeth 24 are staggered such that the slots left by the widened base portions of the teeth, i.e., slots 50, in each longitudinal row are transversely opposite (1) the reduced slots formations left by the shallow pointed ends 34 of the teeth in the next adjacent longitudinal row of teeth and (2) the metal plate portions between the ends of longitudinally adjacent slots in such next adjacent longitudinal rows. By positioning the widened base portions of the slots in this manner, the maximum reduction in net section across the plate at any one point therealong it no greater than the reduction in net section caused by the metal removed by striking the shank portions 52 of the teeth. The foregoing is more particularly appreciated when it is realized that the angle of the edges 46 of the shoulder formations on the teeth is identical to the angle of the edges forming the tips of the teeth. Consequently, while the slots formed by the base portions of the teeth are enlarged at the specified positions along the plate, there is a corresponding reduction in the width of the slot in the next adjacent row of slots at like longitudinal positions whereby the quantity of the metal removed from the plate along any line drawn transversely through the plate is equal to the sum of the quantities of metal removed caused by striking the shank portions of the teeth. This quantity is not increased by laterally enlarging the base portion of the teeth due to their foregoing described relative arrangement in the plate. Since the effective tensile loading which the plate of the present invention can withstand is principally determined by the quantity of metal across the plate and the maximum shear load which the teeth can withstand, the foregoing tooth arrangement optimizes both shear and tensile load bearing capability.

It is another significant feature hereof that the side edges 44 of the base of the teeth extend longitudinally parallel to the axis of the teeth. In this manner, any tear line set up in the plate when cut by the die extends longitudinally and not diagonally across the plate. The effects of a diagonal tear, i.e., loss of net section, is thus eliminated.

It has been found, that certain dimensional relationships in the foregoing slot and teeth arrangement result in a plate particularly useful for hard woods of the type noted above, teeth having unexpectedly high penetration characteristics, a plate having high effective net section, and a plate having improved strength in shear. The dimensions of a specific and preferred embodiment of the present invention are provided below, it being understood that the dimensions per se are given for example only and that such dimensions are used only to illustrate numerical ratios providing dimensional relationships which impart the foregoing noted characteristics to the connector plate.

According to a specific preferred embodiment of the present invention, the width of the shank portion of each tooth indicated W is 0.125 inch while the width S of the teeth at its base and including shoulder portion 44 is 0.172 inch. The ratio of the width of the shank portion of the tooth to the shoulder portion of the tooth is thus W/S or 0.726 and ought not be less than 0.5 in order that the net section be maintained. The shortest distance q between transversely adjacent slots, that is, between the edges of the slots from which the shank portions of the teeth are struck, is 0.247 inch. The apparent minimum distance g between the slots of adjacent rows is 0.20 inch. Accordingly, the ratio of actual net section to apparent net section q/g is 0.247/0.2 or 1.235. Thus, the actual net section is approximately 1¼ times the apparent net section, thus providing an unexpected increase in tensile strength of the plate. It is significant to note that the distance between the transversely adjacent slots at any point therealong is never less than the transverse distance between the shank portions of the slots indicated q. Also, it will be appreciated that the distance r between the edge of the slot at the juncture c of the shank and tip edge and the edge d of the slot left by the tooth shoulder in a next adjacent slot is greater than the minimum distance q between the slots in adjacent rows of teeth. The tooth length is 0.594 inch and, accordingly, the length to width ratio L/W equals 4.75. The distance p between the front face of a tooth in one row and the front face of a tooth in the next adjacent row is 0.712 inch. The distance h between the backs of next adjacent teeth in next adjacent longitudinal rows is 0.258 inch. The distance m between the backs of adjacent teeth in each longitudinally row is 1.125 inches. The ratio of h/m is thus 0.238 and should be no less than about 0.20. The distance from the edge of the plate to the centerline of the first row of teeth is 0.190 inch. For a 6-inch nominal width plate having an actual width of 5.96 inches, it will be appreciated that a plate having the foregoing dimensions has 16 longitudinally extending rows of teeth.

With the foregoing dimensioned plate, the net reduction in metal material due to the formation of the slots in the plate is approximately 33 percent of the plate cross section and it will be appreciated that, with the foregoing arrangement of the rows of teeth, the net section across the plate at any of the shouldered portions of the teeth is no less than 67 percent of the width of the plate and, in fact, is considerably more.

The included angle e should be greater than 80 percent and, in the preferred embodiment, is 100°. As will be recalled, this provides a partially blunt tooth tip to preclude splitting the wood upon insertion.

It will be appreciated that the foregoing plate can thus be embedded into members formed of particularly hard woods requiring high insertion pressures without buckling or collapse of teeth upon insertion. The teeth are reinforced along their longitudinal extent by their particular cross section as well as by the increased quantity of metal provided at their base portions. Moreover, the shallow pointed ends preclude lumber splitting in particularly hard woods while the novel disposition of the teeth in the plate substantially precludes the formation of cuts across the wooden members. The foregoing results in an improved plate having significant load bearing capability and particularly useful for the harder woods.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A connector for joining wooden members one to the other comprising: a sheet metal plate having a plurality of nail-like teeth struck therefrom for embedment into the wooden members, the struck faces of said teeth being generally concave, said teeth having end portions, shank portions, and base portions with said end and base portions extending a distance along the associated tooth no greater than one-half its length, said end portions being pointed with the edges of each said tooth defining the pointed end portions thereof forming an included angle no less than 80°, said teeth being struck from said plate in substantially parallel longitudinally extending rows leaving a plurality of longitudinally extending and spaced elongated slots in the plate lying generally in laterally spaced substantially parallel rows, the slots in each of said rows extending from said teeth in like directions with the slots in next adjacent rows extending from the associated teeth in opposite directions, the base portions of said teeth being wider than the shank and pointed end portions thereof, the shank portions of said teeth being wider than the pointed end portions, the teeth in next adjacent rows thereof being longitudinally staggered with respect to one another, the teeth in every other row thereof lying in transverse alignment one with the other, the base portion of each of said teeth including a shoulder on each of the opposite sides thereof and defined in part by a lateral edge extending from said plate substantially parallel to the centerline of said tooth and an edge extending from said lateral edge inwardly toward the end portion of the tooth and the tooth centerline, the slots left by the shoulders of the teeth in each longitudinal row thereof lying transversely opposite at least the reduced slot formations left by the pointed ends of the teeth in the next adjacent longitudinal rows thereof, the edges of said pointed end portions and the inwardly extending shoulders on like sides of said teeth extending substantially at a like angle whereby a substantially constant transverse distance is maintained between the transversely adjacent slot portions from which the pointed end and shouldered tooth portions are struck, the quantity of metal along any transversely extending line across said plate being no less than the sum of the quantities of metal between the portions of the slots in lateral adjacent rows from which the shank portions of the teeth are struck.

2. A connector according to claim 1 wherein the ratio of the spacing of next adjacent back-to-back teeth in adjacent longitudinal rows to the spacing of the adjacent teeth in each longitudinal row is no less than 0.20.

3. A connector according to claim 1 wherein the ratio of the width of the shank portion of each tooth to the shoulder portion thereof is no less than 0.5.

4. A connector according to claim 1 wherein the ratio of the actual net section to the apparent net section is about 1.25 whereby high tensile strength is achieved.

5. A connector according to claim 1 wherein the teeth have a length to width ratio of about 4.75.

6. A connector according to claim 1 wherein the ratio of the distance between the backs of next adjacent teeth in next adjacent longitudinal rows to the distance between the backs of adjacent teeth in each longitudinal row is no less than 0.20.

7. A connector according to claim 1 wherein the net section across the plate at any transverse location of a slot from which the shoulder portion of a tooth is struck is greater than 67 percent of the width of the plate.

8. A connector according to claim 1 wherein the ratio of the width of the shank portion of each tooth to the shoulder portion thereof is no less than 0.5, the ratio of the actual net section to the apparent net section being about 1.25 whereby high tensile strength is achieved, the teeth having a length to width ratio of about 4.75, the ratio of the distance between the backs of next adjacent teeth in next adjacent longitudinal rows to the distance between the backs of adjacent teeth in each longitudinal row being no less than 0.20, the net section across the plate at any transverse location of a slot from which the shoulder portion of a tooth is struck being greater than 67 percent of the width of the plate, said plate being formed of 14 U.S. Standard Gauge sheet metal.

* * * * *